US005829803A

United States Patent [19]

Reibl

[11] Patent Number: 5,829,803

[45] Date of Patent: Nov. 3, 1998

[54] MAGAZINE FOR FILM CARTRIDGES

[75] Inventor: Michael Reibl, Boeblingen, Germany

[73] Assignee: Eastman Kodak Company, Rochester, N.Y.

[21] Appl. No.: 713,302

[22] Filed: Sep. 13, 1996

[30] Foreign Application Priority Data

Sep. 23, 1995 [DE] Germany ........................ 195 35 448.6

[51] Int. Cl.[6] ............................ G03B 17/26; G03D 13/08

[52] U.S. Cl. ....................... 242/594; 242/594.3; 396/512; 396/599

[58] Field of Search .............................. 242/554.3, 555.5, 242/559.1, 594, 594.3, 594.4, 594.5, 594.6; 396/512, 599

[56] References Cited

U.S. PATENT DOCUMENTS

| | | | |
|---|---|---|---|
| 3,753,486 | 8/1973 | Vogt et al. | 198/131 |
| 4,797,698 | 1/1989 | Uenaka et al. | 242/594.3 |
| 5,390,872 | 2/1995 | Cipolla et al. | 242/594.3 |
| 5,450,160 | 9/1995 | Tianello et al. | 221/76 |
| 5,473,402 | 12/1995 | Long et al. | 396/599 |
| 5,488,448 | 1/1996 | Merle et al. | 396/599 |
| 5,523,816 | 6/1996 | Sherman, Jr. et al. | 396/512 |
| 5,600,394 | 2/1997 | DeCook et al. | 396/512 |

*Primary Examiner*—John P. Darling
*Attorney, Agent, or Firm*—Frank Pincelli; David A. Novais

[57] ABSTRACT

An apparatus for receiving multiple film cartridges that, for processing of the filmstrips present in the film cartridges, can be attached to a processing machine. The apparatus, configured as a magazine includes a cylindrical member that has chambers, arranged in a circle about the member center axis, in which the film cartridges are housed axially one above another. Each of the chambers has an opening terminating at the circumferential surface of the member. In addition, a sleeve mounted on the circumferential surface of the member and covering all the openings, which has a removal slot of the width and length of one of the openings, is provided. Cover panels associated with each film cartridge are mounted displaceably on the sleeve to cover or uncover the removal slot.

12 Claims, 4 Drawing Sheets

MAGAZINE FOR FILM CARTRIDGES

FIELD OF THE INVENTION

The invention concerns an apparatus for receiving multiple film cartridges that, for processing of the filmstrips present in the film cartridges, can be attached to a processing machine, and has chambers in a cylindrical member, arranged in a circle about the member center axis, in which the film cartridges are housed axially one above another.

BACKGROUND OF THE INVENTION

In order to develop exposed films, the individual filmstrips are removed from the film cartridges, spliced together and, wound onto a drum, fed into the film developing machine.

The individual filmstrips are spliced together in a splicer apparatus, the filmstrips being automatically removed from the film cartridge and spliced together. After film development and production of prints, the filmstrips, the completed prints, and the associated mailing envelopes are assembled correctly at a delivery point, priced, and sent back to the customers.

To automate splicing of the filmstrips, U.S. Pat. No. 3,753,486 discloses an apparatus for loading automatic film processing machines which has a motor-driven carousel that is equipped with slide-in retainers for magazines, each of which has multiple compartments for positioned receiving of one film container each. Arranged at a specific point on the rotation path of the magazines positioned on the carousel is a transport apparatus for lifting displacement of one magazine at a time, which when the magazine pivots inward automatically couples with it and moves all the magazine compartments, in stepped fashion, past a specific point for processing of the film containers.

Also proposed is an apparatus in which axially aligned chambers are configured in a cylindrical member in a circle about the member center axis, in which chambers multiple film cartridges are housed, stacked axially one above another. This apparatus is coupled to a splicer apparatus for automatic removal of the film cartridges and for processing of the filmstrips.

The disadvantage of this apparatus becomes evident when a defective film cartridge is detected in one of the chambers. In this instance an entire column of film cartridges must be removed, by means of a separate auxiliary apparatus, from the chamber in question, and the defective film cartridge separated and repaired; and if this is not immediately possible, an empty cartridge must be placed at this point and the entire column put back into the chamber.

This procedure is time-consuming and laborious, and interrupts the film processing process in an intolerable manner. If the defective film cartridge is not removed, this causes machine jams and possibly damage to the machine, the film cartridge, and not least the filmstrip, so that proper print production can no longer be guaranteed.

SUMMARY OF THE INVENTION

It is the object of the invention to configure an apparatus of the aforesaid kind in such a way that a defective film cartridge can be removed directly from the chamber with no need to remove the apparatus from the splicer apparatus.

According to the invention, this is achieved by the fact that each of the chambers has an opening terminating at the circumferential surface of the member; that a sleeve mounted on the circumferential surface of the member and covering all the openings, which has a removal slot of the width and length of said openings, is provided; and that cover panels associated with each film cartridge are mounted displaceably on the sleeve to cover or uncover the removal slot.

Specifically, the subject of the invention is configured so that the dimensions of an opening correspond to the width and height of a chamber.

In addition, a spring element, which can be brought into contact against a film cartridge with resilient preload, is provided on each cover panel.

It is now advantageously possible to remove a film cartridge from the chamber when a cover panel is open, such that the film cartridge located above can be held in place by means of a spring element of the cover panel associated with it.

The accessible film cartridges can preferably be removed from the chamber by means of a flexurally rigid strip that can be inserted into the chamber and, after looping around the film cartridge, guided back out of the chamber.

This procedure can be performed quickly without removing the apparatus from the splicer apparatus, and with no need to separate, by means of a complex auxiliary apparatus, the entire column of film cartridges located in a chamber. The film processing work flow is thus interrupted for only a very short time.

BRIEF DESCRIPTION OF THE DRAWINGS

Further features and advantages are evident from the description of an embodiment of the invention depicted in the drawing, and from the additional subclaims. In the drawings:

DETAILED DESCRIPTION OF THE INVENTION

Figure 1:
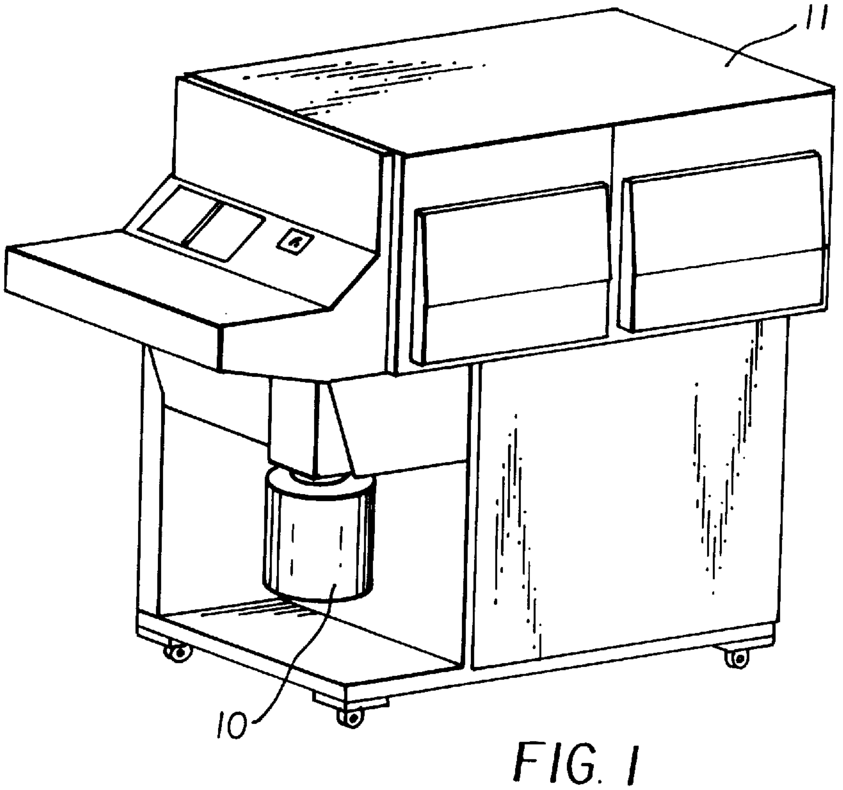
FIG. 1 is a splicer apparatus for joining filmstrips, with the apparatus according to the invention in a vertical arrangement, in a perspective view.
Figure 2:
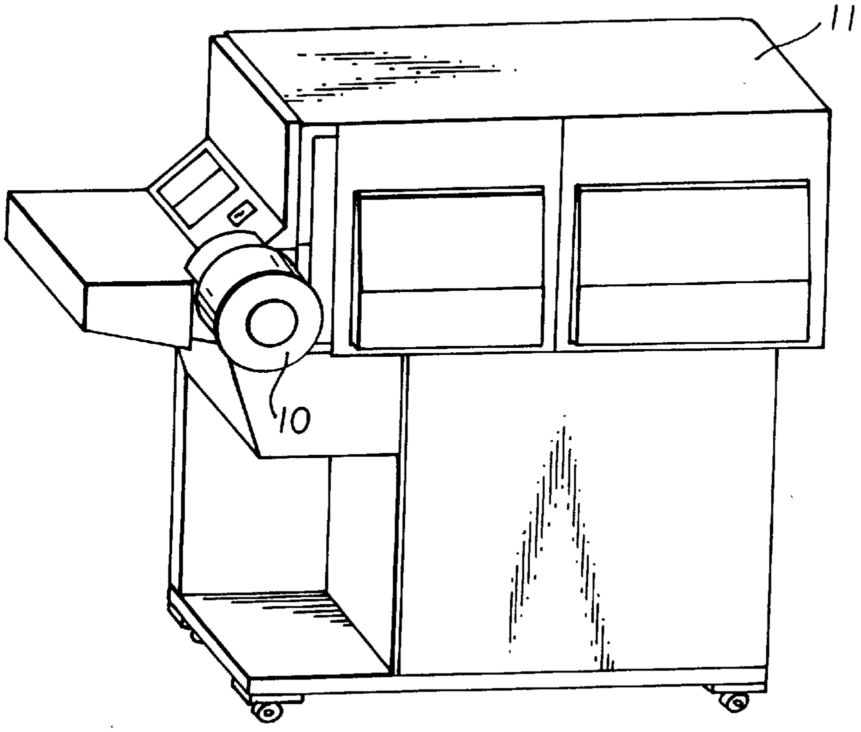
FIG. 2 is a splicer apparatus with the apparatus according to the invention in a horizontal arrangement, in a perspective view.
Figure 3:
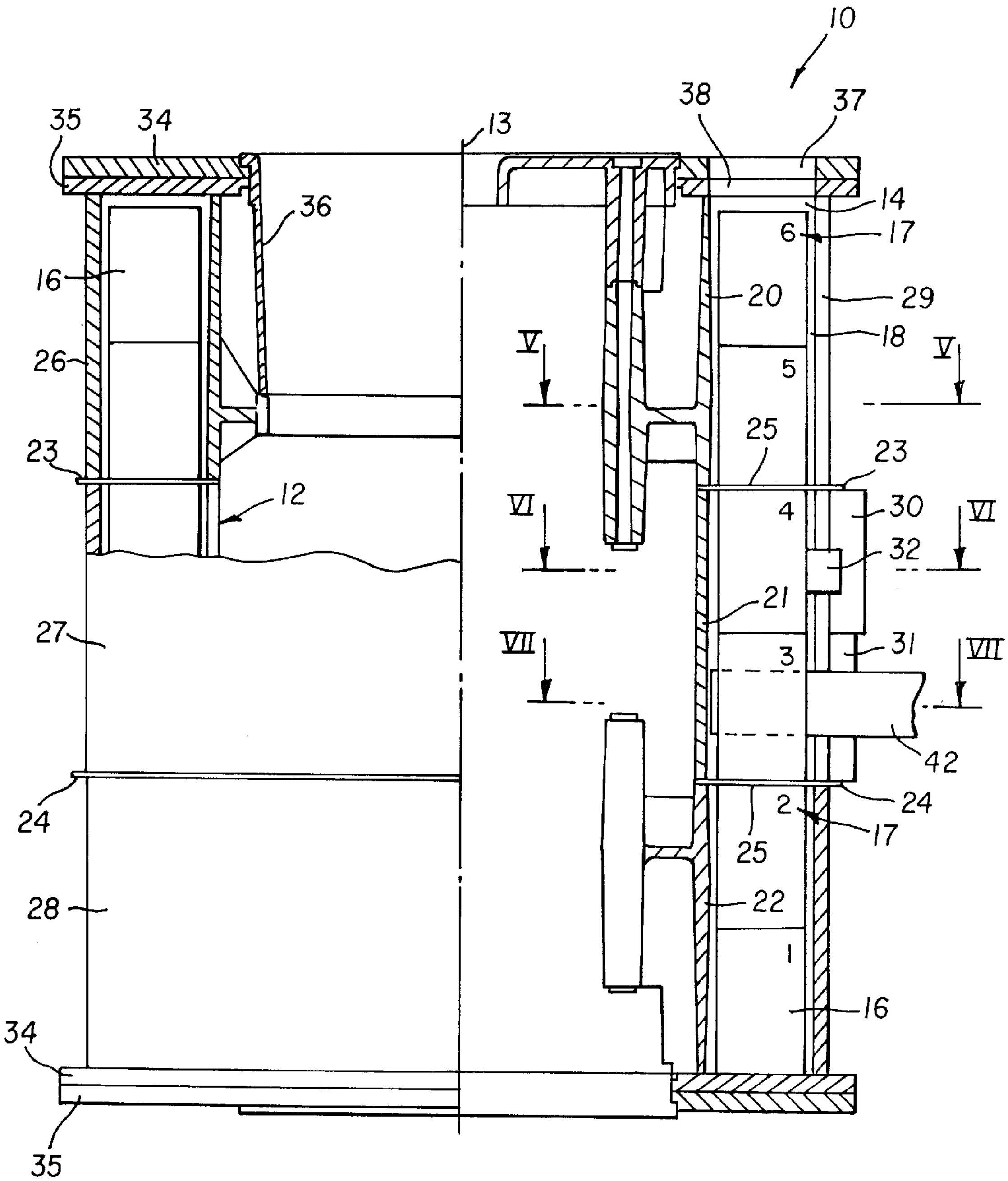
FIG. 3 is the apparatus according to the invention for receiving film cartridges in cross-section.
Figure 4:
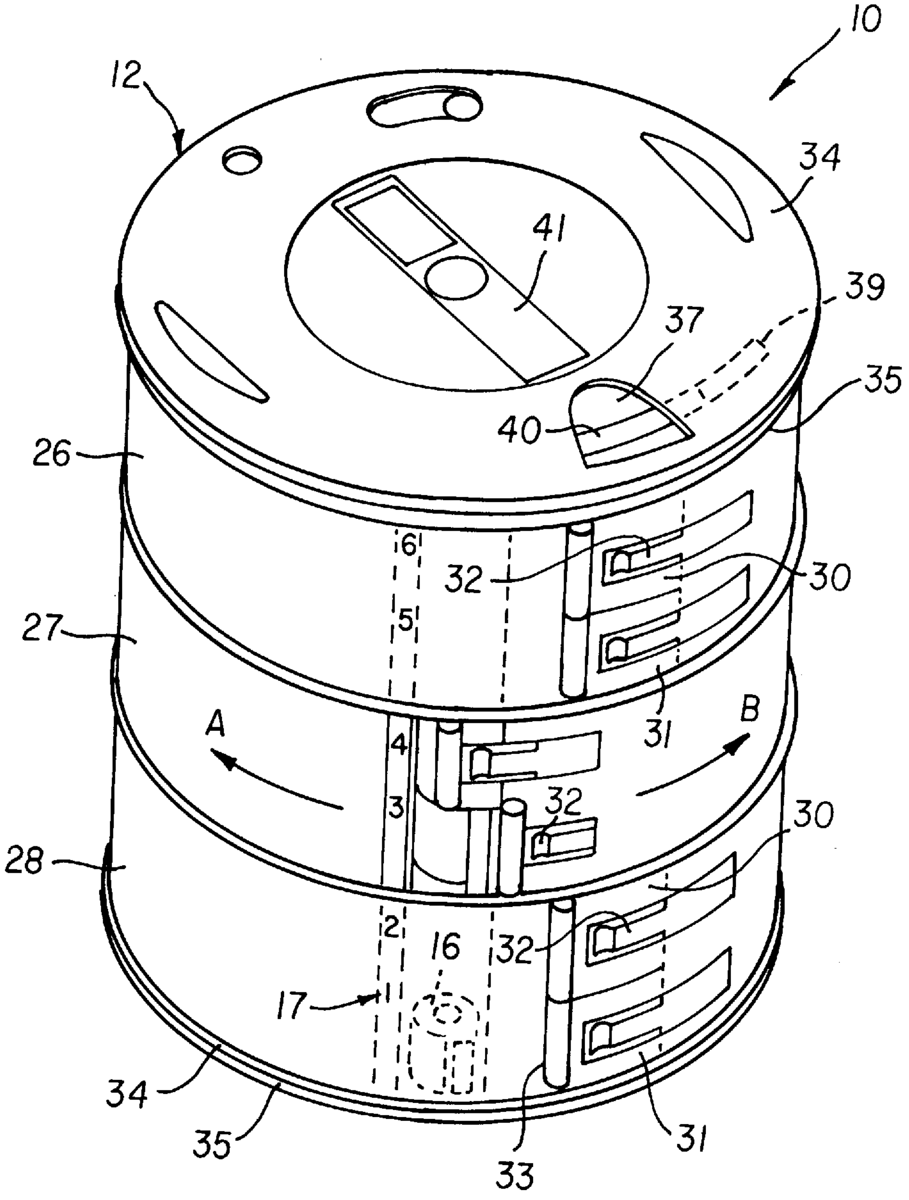
FIG. 4 is the apparatus according to FIG. 3 in a perspective view.

For the development of exposed films, the individual filmstrips are removed from the film cartridges and spliced together, and wound onto a film drum that is inserted into a developing machine. In order to automate the splicing process, the apparatus according to the invention, a magazine for receiving a plurality of film cartridges, was developed. This magazine 10 is attached to a splicer apparatus 11 either in the vertical position as shown in FIG. 1, or in the horizontal position as shown in FIG. 2. The filmstrips are removed from the film cartridges and processed by means of a mechanism that is not depicted. It is conceivable that after processing of the filmstrips, the latter are put back into the corresponding film cartridges, which are then conveyed, together with the mailing envelopes and finished prints, to a final processing system or delivery point.

Magazine 10 consists of a cylindrical member 12 in which chambers 14 are arranged, separated from one another only by an elongated web 15, circularly about member center axis 13. Chambers 14 are equipped with openings 18 which terminate at the circumferential surface 19 of cylindrical member 12. Film cartridges 16 are housed, layered one above another, in chambers 14, in such a way that their film slots are turned outward. Location numbers 17 for each film cartridge 16 present in the magazine are evident on the surfaces of elongated webs 15 that face radially outward.

In the embodiment, cylindrical member 12 consists, for production-engineering reasons, of three submembers 20, 21, and 22, the height of which is such that there is room in each for two film cartridges 16 one above another. The three submembers 20, 21, and 22 are immovably joined to one another by screws (not depicted), and arranged immovably between them are spacers 23 and 24, which in the region of chambers 14 have passthrough openings 25 for film cartridges 16. Spacers 23 and 24 also provide support and guidance for sleeves 26, 27, and 28, which surround submembers 20, 21, and 22 respectively in loose and rotatable fashion, and cover openings 18 of chambers 14. At the same time they form the outer wall of magazine 10. At one point, sleeves 26, 27, and 28, made of transparent material, have a removal slot 29 which extends over the entire height of submember 20, 21, and 22 and is at least as wide as opening 18 of a chamber 14. To remove a defective film cartridge 16, the corresponding sleeve 26, 27, or 28 is rotated until removal slot 29 is coincident with opening 18 of chamber 14 in which the defective film cartridge is located.

Removal slot 29 of each sleeve 26, 27, and 28 can be covered and uncovered by means of two cover panels 30 and 31 guided displaceably on the sleeve in the circumferential direction of member 12. Each of cover panels 30 and 31 has a pressure spring 32 that is configured as a leaf spring arm cut out of the cover panel. For easy movement of cover panels 30 and 31 in directions A and B, a handle 33 is provided thereupon.

The free ends of member 12 are each covered by two closure disks 34 and 35, which are each mounted, so they can rotate with respect to one another about member center axis 13, on a cup-shaped hub 36 retained in member 12. The two closure disks 34 and 35 are forced into their closed starting position with respect to one another by means of a tension spring (not depicted). To open a chamber 14 in order to insert or remove film cartridges 16, the two closure disks are rotated with respect to one another until an inlet opening 37 of upper closure disk 34 is coincident with a passthrough opening 38 of lower closure disk 35 exactly above a chamber 14. Stops (not depicted) limit the movement of the closure disk.

A curved sliding guide consists of a groove 39 in lower closure disk 35 and a web 40 on upper closure disk 34. This configuration on the one hand allows easy rotation of closure disks 34 and 35, while on the other hand web 40 prevents film cartridges 16 from falling into passthrough opening 38 of lower closure disk 35, since web 40 has the same height as lower closure disk 35.

A transport handle 41 is provided transversely across the open diameter of hub 36 so that magazine 10 can be handled easily.

Once a magazine 10 as described above has been attached to a splicer apparatus 11, it may happen that a film cartridge 16 is defective and, for example, the filmstrip cannot be pulled out of the film cartridge. In order to disrupt and interrupt the film development working procedure no more than necessary, this defective film cartridge must be removed from magazine 10 and repaired and reinserted, or replaced by an empty cartridge if repair is not possible.

Figure 6:
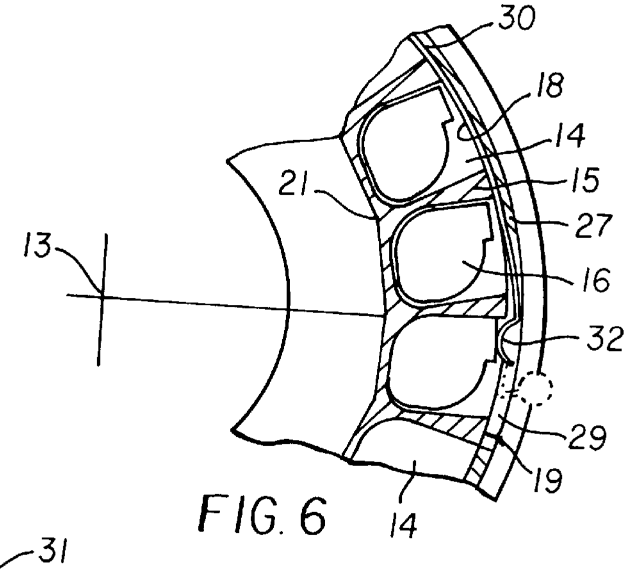
FIG. 6 is a detail of the apparatus according to FIG. 3 with a cover panel in a locked position in an enlarged depiction in cross-section.
Figure 7:
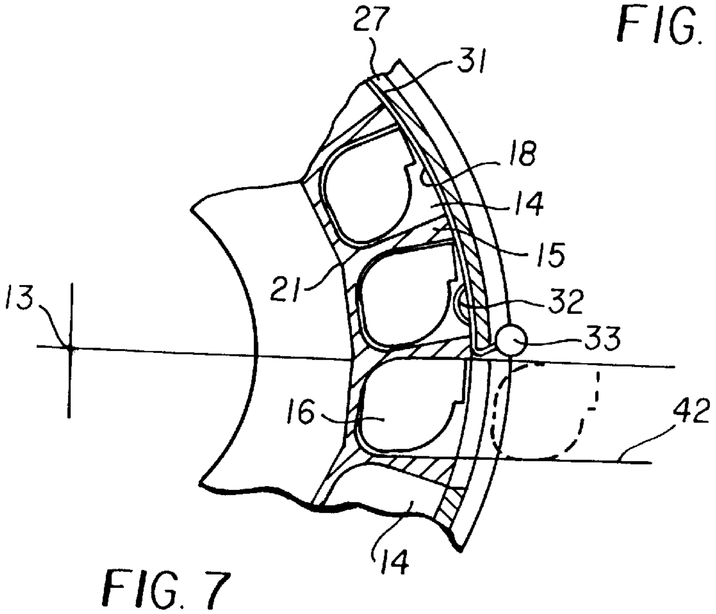
FIG. 7 is a detail of the apparatus according to FIG. 3 with a cover panel in the open position in an enlarged depiction in cross-section.

The invention makes this easily possible, by moving sleeve 26, 27, or 28 of submember 20, 21, or 22 respectively, in the region of which the defective film cartridge is located, so that its removal slit 29 is located opposite the corresponding chamber 14. Cover panel 30 or 31 located above the defective film cartridge is then brought into the position shown in FIG. 6, and film cartridge 16 located above the defective film cartridge is thereby held in place by pressure spring 32. This prevents the film cartridges located above from sliding down, and thus mixing up the correlation between film cartridges and mailing envelopes, when the defective film cartridge is removed. Lower cover panel 31 is then opened completely (see FIG. 7). The defective film cartridge can now be removed.

This is done by inserting a flexible strip 42 into chamber 14. The strip loops around the film cartridge, and as a result of a guide on the chamber wall, re-emerges from member 12 on the other side of the film cartridge. Both ends of strip 42 are then grasped, and the defective film cartridge is taken out of chamber 14.

Figure 5:
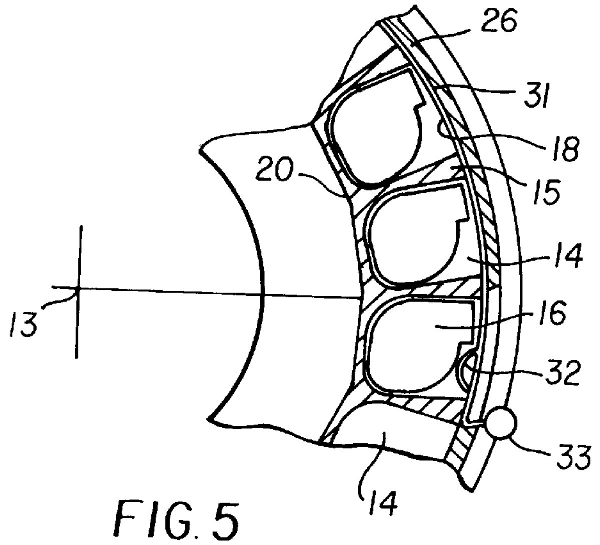
FIG. 5 is a detail of the apparatus according to FIG. 3 with a cover panel in a starting position in an enlarged depiction in cross-section.

After repair, the same film cartridge or an empty cartridge is inserted back into chamber 14, and cover panels 30 and 31 are closed so that they occupy the position shown in FIG. 5.

In this simple manner it is possible, with the new magazine, to repair or replace a defective film cartridge without having to remove the magazine from the splicer apparatus.

I claim:

1. Apparatus for receiving multiple film cartridges that, for processing of filmstrips present in the film cartridges, can be attached to a processing machine, and has chambers in a cylindrical member, arranged in a circle about the cylindrical member center axis, the film cartridges being housed axially one above another in the chambers, wherein each of the chambers has an opening terminating at a circumferential surface of the cylindrical member; a sleeve is mounted on the circumferential surface of the cylindrical member and covers all the openings, the sleeve having a removal slot of a width and length of said openings; and cover panels associated with each film cartridge are mounted displaceably on the sleeve to cover or uncover the removal slot.

2. Apparatus according to claim 1, wherein the dimensions of said openings correspond to a width and height of said chambers.

3. Apparatus according to claim 1, wherein a pressure spring, which can be brought into contact against a film cartridge with spring preload, is provided on each cover panel.

4. Apparatus according to claim 3, wherein the pressure spring is a resilient tongue configured on the cover panel.

5. Apparatus according to claim 3, wherein when a cover panel is open, a film cartridge can be removed from a chamber; and the film cartridge located above it can be locked in place by means of the pressure spring of the cover panel associated with it.

6. Apparatus according to claim 5, wherein the accessible film cartridge can be removed from the chamber by means of a flexurally rigid strip that can be slid into the chamber and, after looping around the film cartridge, guided back out of the chamber.

7. Apparatus according to claim 1, wherein the cylindrical member consists of a plurality of submembers, arranged axially one above another, for receiving one or more film cartridges located axially one above another; and each submember is surrounded by a subsleeve.

8. Apparatus according to claim 7, wherein spacers, which have passthrough openings in the region of said chambers, are provided between the submembers.

9. Apparatus according to claim 8, wherein the spacers provide mounting for the sleeves.

10. Apparatus according to claim 7, wherein the sleeve or subsleeves are made of a transparent material.

11. Apparatus according to claim 1, wherein the cover panel has the same curvature as the sleeve.

12. Apparatus according to claim 1, wherein guides for the cover panels, extending in a circumferential direction, are provided on the sleeve.

* * * * *